Oct. 21, 1924.  
T. W. McDONALD  
TREE STOCK GUARD  
Filed Dec. 10, 1923
1,512,618
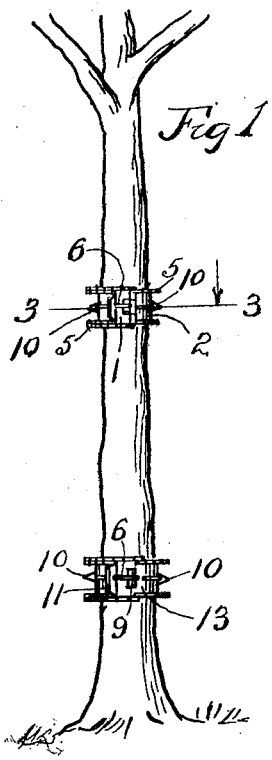
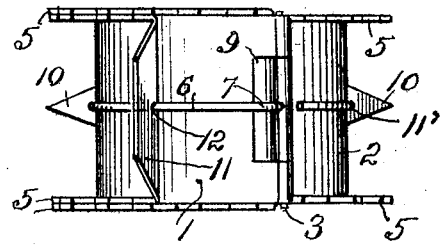
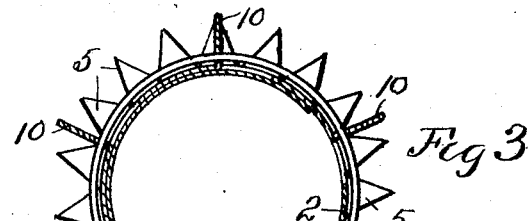
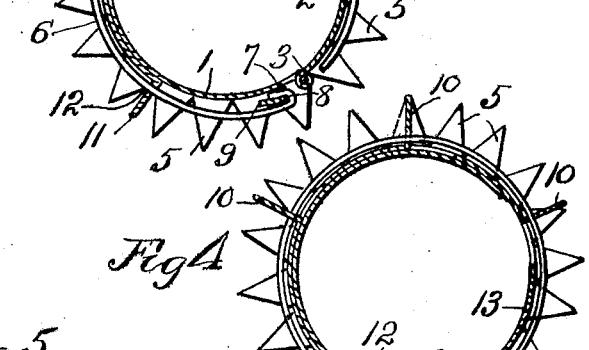
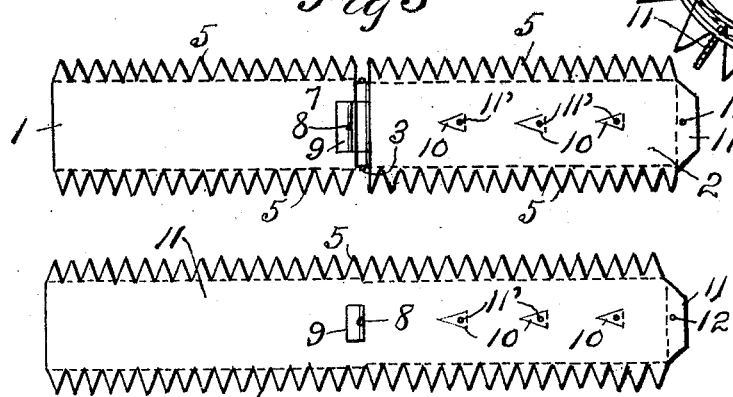
INVENTOR.  
Thomas Wayne McDonald  
BY Warren D. House  
His ATTORNEY.
Witness:  
R. E. Hamilton Patented Oct. 21, 1924.

1,512,618

UNITED STATES PATENT OFFICE.

THOMAS WAYNE McDONALD, OF AVONDALE, MISSOURI.

TREE STOCK GUARD.

Application filed December 10, 1923. Serial No. 679,740.

*To all whom it may concern:*

Be it known that I, THOMAS WAYNE MC-DONALD, a citizen of the United States, residing at Avondale, in the county of Clay and State of Missouri, have invented a certain new and useful Improvement in Tree Stock Guards, of which the following is a specification.

My invention relates to improvements in tree stock guards, having for its purpose the protection of trees from injury by stock such as horses, cattle, pigs, etc.

One of the objects of my invention is to provide a guard of the kind described, which is simple, cheap, durable, not liable to get out of order, which can be easily and quickly applied to the trunk of a tree, which will expand to accommodate itself to the growth of the tree, which will securely hold itself in its operative position, and which is efficient in operation.

My invention provides further a novel guard which is expansible and which has novel means for yieldingly holding the guard from expansion excepting such as is due to the tree growth.

The novel features of my invention are hereinafter fully described and claimed.

In the accompanying drawing, which illustrates my invention,

Fig. 1 is an elevation showing two of my improved guards applied to a tree trunk.

Fig. 2 is an enlarged side elevation of the preferred embodiment of my invention.

Fig. 3 is a horizontal section on the line 3—3 of Fig. 1.

Fig. 4 is a view similar to Fig. 3 showing a modified form of my improved guard.

Fig. 5 is a plan view of the barbed member shown in Figs. 1, 2 and 3, shown in flat form.

Fig. 6 is a view similar to Fig. 5 of the form of barbed member shown in Fig. 4.

Similar reference characters designate similar parts in the different views.

Referring first to Figs. 1, 2, 3 and 5, 1 and 2 designate two flat bands, preferably metal, such as galvanized iron, brass, or aluminum, which are hinged together at adjacent ends by a hinge pintle 3. The bands 1 and 2 form a barbed member adapted to be formed around the tree trunk 4, Fig. 1, and having each at its longitudinal edges outwardly extending pointed barbs 5. The bands 1 and 2 are flexible so that they can be formed around a small tree trunk and can be expanded by the trunk during its growth.

For yieldingly holding the bands 1 and 2 in their operative positions, there is provided a holding member, which may be a resilient wire 6, of arcuate form and which is adapted to embrace the bands 1 and 2. The member 6 has a hook 7 at one end, which extends through a hole 8 in a lip 9 formed in the band 1 adjacent to the hinge connection. The band 2 has medial pointed barbs 10 extending outwardly and provided each with a transverse hole 11' through which extends the member 6, the latter having a slidable, frictional engagement with the barbs 10, which engagement yieldingly holds the bands from accidental expansion, but which permits the bands to expand as the trunk of the tree grows in diameter.

The free end of the band 2, is preferably provided with an outwardly extending transverse flange 11 having a hole 12 through which the wire member 6 extends.

In Fig. 5 are shown the bands 1 and 2 connected to each other by the pintle 3 and prior to the barbs 5 and 10 and the flange 11 being bent outwardly at right angles to the bands.

In the operation of the form shown in Figs. 1, 2, 3 and 5, the bands 1 and 2 are formed around the tree trunk 4 so as to overlap each other, after which the wire member 6 is threaded through the holes 12 and 11', and the hook 7 is inserted in the hole 8 of the lip 9. The bands 1 and 2 are then slid one over the other to positions in which they will tightly embrace the tree trunk, in which positions they will be yieldingly held by the member 6. As the tree trunk grows in diameter, the bands will be forced to expand, the member 6 yielding to such expansion action.

The stock having access to the trees which are protected by my improved guards, after once being pricked by the barbs of the guards, will keep clear of the trees. The guards may be placed at different positions on the tree trunk, those for protection from pigs being placed near the ground, while those used for protection from cattle or horses are placed higher on the trunk, as shown in Fig. 1.

By having the ends of the guard or barb member overlap to a considerable extent, the guard may be expanded to a relatively large diameter, so as to guard the tree until it has reached a large size.

In the form shown in Figs. 4 and 6, the barb member is made of a single flexible band 13 having, as in the other form of my invention, barbs 5 along its two longitudinal edges.

In all other respects, the form shown in Figs. 4 and 6 conforms in structure and mode of operation and function to the form shown in Figs. 1, 2, 3 and 5.

In both forms of my invention, the wire member 6 by its frictional action and resiliency, holds the bands from accidental expansion from their operative position closely embracing the tree trunk, while the expansion caused by the growth in diameter of the tree trunk is effected without injury to the tree and without loosening the guard from the trunk.

I do no limit my invention to the structures shown and described, as many modifications, other than that shown and described, may be made within the scope of the appended claims, without departing from the spirit of my invention.

What I claim is:—

1. A tree guard comprising two flexible bands hinged together at adjacent ends and adapted to embrace a tree trunk and having each outwardly extending barbs, and a holding member embracing said bands and having frictional sliding engagement with some of the barbs of one of said bands for yieldingly holding said bands from expansion.

2. In a tree guard, two flexible bands hinged together at adjacent ends and adapted to embrace a tree trunk and having each outwardly extending barbs, and a resilient arcuate holding wire embracing said bands and having slidable frictional engagement with some of the barbs of one of said bands for yieldingly holding said bands from expansion.

In testimony whereof I have signed my name to this specification.

THOMAS WAYNE McDONALD.